US010054062B1

(12) United States Patent
Andrasko et al.

(10) Patent No.: US 10,054,062 B1
(45) Date of Patent: Aug. 21, 2018

(54) SYSTEMS AND METHODS FOR CONTROLLING AN ELECTRONIC THROTTLE VALVE

(71) Applicant: Brunswick Corporation, Lake Forest, IL (US)

(72) Inventors: Steven J. Andrasko, Oshkosh, WI (US); Jason S. Arbuckle, Horicon, WI (US); Thomas S. Kirchhoff, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 919 days.

(21) Appl. No.: 14/570,760

(22) Filed: Dec. 15, 2014

(51) Int. Cl.
*B60T 7/12* (2006.01)
*F02D 9/10* (2006.01)
*F02D 9/02* (2006.01)

(52) U.S. Cl.
CPC ............... *F02D 9/105* (2013.01); *F02D 9/02* (2013.01); *F02D 2009/0294* (2013.01)

(58) Field of Classification Search
CPC ....... F02D 2041/227; F02D 2009/0277; F02D 2200/0404; F02D 35/0007; F02D 2009/0269
USPC .......................... 123/399; 701/101, 102, 103
See application file for complete search history.

(56) References Cited

U.S. PATENT DOCUMENTS 4,505,169 A 3/1985 Ganoung
4,939,660 A 7/1990 Newman et al.
5,080,064 A 1/1992 Buslepp et al.
5,171,172 A 12/1992 Heaton et al.
5,836,851 A 11/1998 Ruman
5,848,582 A 12/1998 Ehlers et al.
6,009,371 A 12/1999 Kobayashi
6,152,102 A 11/2000 Ruman
6,273,771 B1 8/2001 Buckley et al.
(Continued)

FOREIGN PATENT DOCUMENTS

EP 1170484 A2 1/2002
WO 00/68744 A1 11/2000

OTHER PUBLICATIONS

Arbuckle et al., "Systems and Methods for Setting Engine Speed Using a Feed Forward Signal," Unpublished U.S. Appl. No. 14/573,202, filed Dec. 17, 2014.
(Continued)

*Primary Examiner* — Marguerite McMahon
*Assistant Examiner* — James Kim
(74) *Attorney, Agent, or Firm* — Andrus Intellectual Property Law, LLP

(57) ABSTRACT

A method for controlling a position of an electronic throttle valve of an internal combustion engine is provided. The method includes determining a desired throttle valve position; determining a first feed forward signal based on a rate of change between a previous throttle valve position and the desired throttle valve position; and determining a second feed forward signal based on a comparison of the desired throttle valve position to a limp home position of the throttle valve, in which the throttle valve is biased open by a spring. A summation of the first and second feed forward signals is used to actuate the throttle valve. After the throttle valve has been actuated according to the first and second feed forward signals, the position of the throttle valve is controlled with a feedback controller to obtain the desired throttle valve position.

20 Claims, 5 Drawing Sheets

(56) References Cited

U.S. PATENT DOCUMENTS

| | | | |
|---|---|---|---|
| 6,286,481 B1 | 9/2001 | Bos et al. | |
| 6,298,824 B1 | 10/2001 | Suhre | |
| 6,425,370 B1 | 7/2002 | Kramer | |
| 6,561,016 B1 | 5/2003 | Suhre et al. | |
| 6,587,765 B1 | 7/2003 | Graham et al. | |
| 6,701,890 B1 | 3/2004 | Suhre et al. | |
| 6,757,606 B1 | 6/2004 | Gonring | |
| 7,163,000 B2 * | 1/2007 | Ishida | F02D 9/1065 123/395 |
| 7,357,120 B2 | 4/2008 | Kaji | |
| 7,422,501 B2 | 9/2008 | Mizushima et al. | |
| 7,473,149 B2 | 1/2009 | Mizokawa | |
| 7,549,407 B2 * | 6/2009 | Krupadanam | F02D 11/10 123/361 |
| 7,556,547 B2 | 7/2009 | Kaji | |
| 7,917,283 B2 | 3/2011 | Kado | |
| 7,976,354 B2 | 7/2011 | Kubota et al. | |
| 8,340,847 B2 | 12/2012 | Sako et al. | |
| 8,762,022 B1 | 6/2014 | Arbuckle et al. | |
| 9,039,468 B1 | 5/2015 | Arbuckle et al. | |
| 9,145,839 B1 | 9/2015 | Andrasko | |
| 9,156,536 B1 | 10/2015 | Arbuckle et al. | |
| 9,248,898 B1 | 2/2016 | Kirchhoff et al. | |
| 2002/0086593 A1 | 7/2002 | Shidara et al. | |
| 2003/0000500 A1 | 1/2003 | Chatfield | |
| 2003/0027468 A1 | 2/2003 | Into | |
| 2003/0054704 A1 | 3/2003 | Kanno | |
| 2003/0109184 A1 | 6/2003 | Kanno | |
| 2003/0120360 A1 | 6/2003 | Yasui et al. | |
| 2004/0069271 A1 | 4/2004 | Kanno et al. | |
| 2004/0069272 A1 | 4/2004 | Allen et al. | |
| 2005/0161022 A1 * | 7/2005 | Kishi | F02D 31/002 123/353 |
| 2006/0047406 A1 | 3/2006 | Chatfield et al. | |
| 2006/0118086 A1 | 6/2006 | Schwulst et al. | |
| 2006/0166573 A1 | 7/2006 | Vetta et al. | |
| 2006/0167615 A1 * | 7/2006 | Kunibe | F02D 41/009 701/114 |
| 2008/0051979 A1 | 2/2008 | Yasui et al. | |
| 2008/0280511 A1 | 11/2008 | Kado | |
| 2009/0030587 A1 * | 1/2009 | Yonezawa | F02D 41/009 701/103 |
| 2009/0037073 A1 | 2/2009 | Jung et al. | |
| 2010/0191397 A1 | 7/2010 | Nose et al. | |
| 2011/0172057 A1 * | 7/2011 | Shioura | F02D 11/107 477/186 |
| 2011/0202258 A1 | 8/2011 | Fukushima et al. | |
| 2011/0276213 A1 * | 11/2011 | Tomatsuri | B60K 6/365 701/22 |
| 2011/0297462 A1 | 12/2011 | Grajkowski et al. | |
| 2012/0191275 A1 | 7/2012 | Clever et al. | |
| 2013/0035009 A1 | 2/2013 | Kuriyagawa et al. | |
| 2013/0047957 A1 | 2/2013 | Breuer et al. | |
| 2014/0244130 A1 | 8/2014 | Filev et al. | |
| 2015/0000636 A1 * | 1/2015 | Stockbridge | B60H 1/3222 123/350 |

OTHER PUBLICATIONS

Arbuckle et al., "Systems and Methods for Setting Engine Speed in a Marine Propulsion Device," Unpublished U.S. Appl. No. 14/610,377, filed Jan. 30, 2015.

Newport, Motion Control Coordinate System, www.newport.com, pp. 7-2 through 7-25, website visited Nov. 18, 2014.

Andreas Thomasson & Lars Eriksson, Model-Based Throttle Control using Static Compensators and IMC based PID-Design, IFAC Workshop on Engine and Powertrain Control, Simulation and Modeling, Paris, France, Nov. 30, 2009-Dec. 2, 2009.

* cited by examiner

SYSTEMS AND METHODS FOR CONTROLLING AN ELECTRONIC THROTTLE VALVE

FIELD

The present disclosure relates to systems and methods for controlling an electronic throttle valve, such as a throttle valve of an internal combustion engine powering a marine propulsion device.

BACKGROUND

Many electronic throttle bodies have a limp home feature, in which a spring or springs force the throttle blade to a nominal high-idle condition in case of loss of control of the throttle valve, such as due to a signal or wiring failure. This spring requires that the throttle valve actuator, such as a motor geared to the throttle plate, apply a force to overcome the spring constant in order to move the throttle valve plate. The sign and amount of force required to move the throttle valve plate changes depending on whether the throttle valve is opening or closing, and depending on which side of the limp home position the throttle valve plate is located.

Additionally, a gear train that connects the motor to the throttle valve may have backlash that causes a delay in response of the throttle valve plate to actuation of the motor. Because teeth of meshed gears in the gear train may not be in tight contact with one another, they may have some play or lash between them, resulting in a delay between when a first gear in the gear train is moved until a second gear having teeth complementary to those of the first gear responds to such movement. Such backlash is most often seen when a switch from loading one side of a gear tooth to an opposite side thereof is required, such as when the gear train is actuated to change the direction of the throttle plate from opening to closing, or vice versa.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One example of the present disclosure is of a method for controlling a position of an electronic throttle valve of an internal combustion engine. The method includes determining a desired throttle valve position. The method also includes determining a first feed forward signal based on a rate of change between a previous throttle valve position and the desired throttle valve position, and determining a second feed forward signal based on a comparison of the desired throttle valve position to a limp home position of the throttle valve, in which the throttle valve is biased open by a spring. The first and second feed forward signals are then summed to actuate the throttle valve. After the throttle valve is actuated according to the first and second feed forward signals, the method includes controlling the position of the throttle valve with a feedback controller so as to obtain the desired throttle valve position.

Another example of the present disclosure is of a system for controlling a position of an electronic throttle valve of an internal combustion engine to a desired throttle valve position. The system includes a motor coupled to the throttle valve, a throttle position sensor sensing a current throttle valve position, and a controller in signal communication with the motor and the throttle position sensor. The controller determines a first feed forward signal based on a rate of change between a previous throttle valve position and the desired throttle valve position. The controller also determines a second feed forward signal based on a comparison of the desired throttle valve position to a limp home position of the throttle valve, in which the throttle valve is biased open by a spring. The controller then combines the first and second feed forward signals and sends them to the motor to actuate the throttle valve. After actuating the throttle valve according to the first and second feed forward signals, the controller compares the current throttle valve position to the desired throttle valve position and generates a feedback signal to correct the position of the throttle valve.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clarity, and understanding. No unnecessary limitations are to be inferred therefrom beyond the requirement of the prior art because such terms are used for descriptive purposes only and are intended to be broadly construed.

Figure 1:
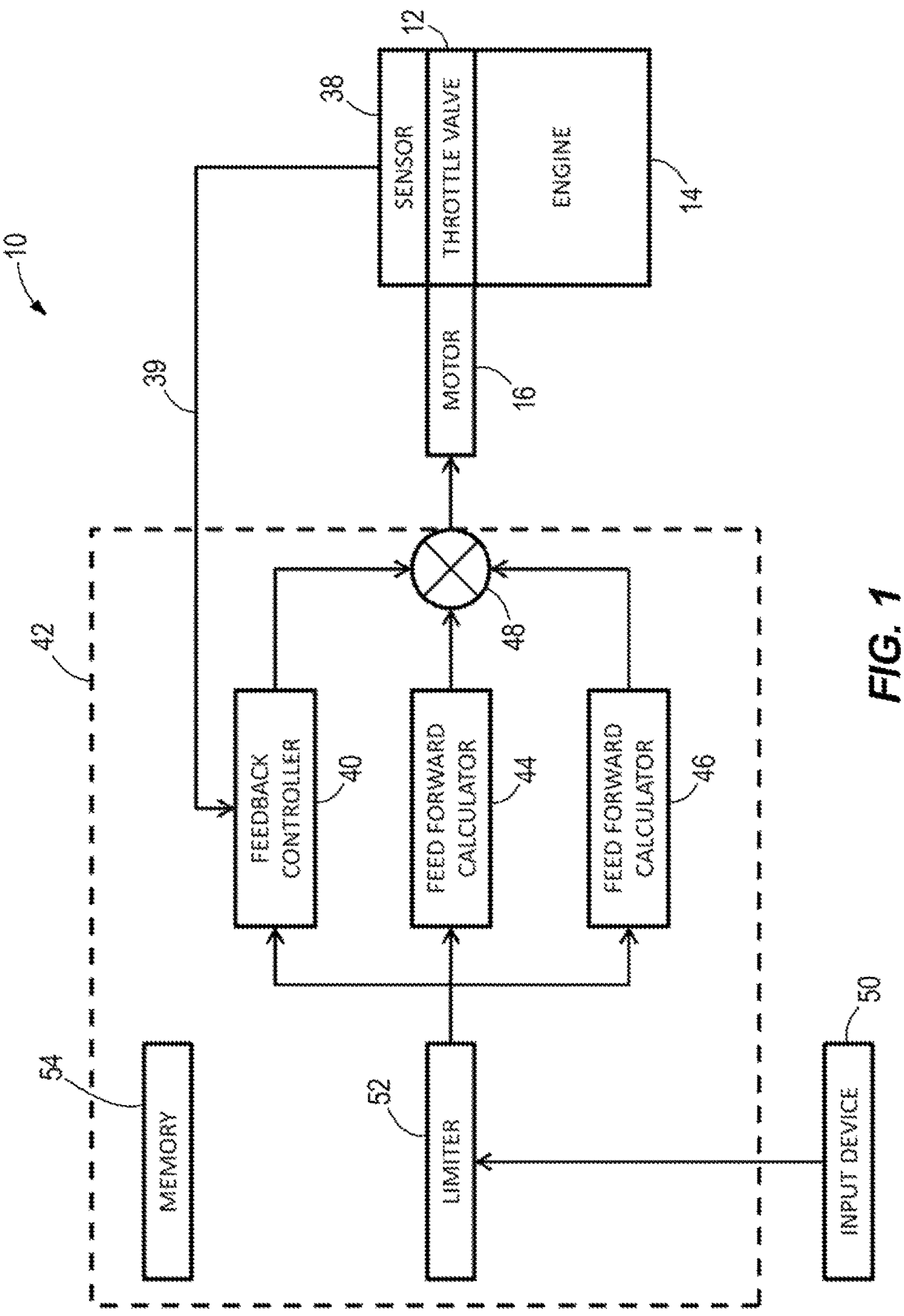
FIG. 1 illustrates a system for controlling a position of an electronic throttle valve according to the present disclosure.

FIG. 1 illustrates a system 10 for controlling a position of an electronic throttle valve 12 of an internal combustion engine 14, such as an engine powering a marine propulsion unit. The system 10 controls the position of the electronic throttle valve 12 to a desired throttle valve position. To do so, the system 10 uses an actuator such as motor 16 geared to the throttle valve 12, which motor 16 is controlled by signals from a controller 42. The controller 42 includes a memory 54 and a programmable processor. As is conventional, the processor can be communicatively connected to a computer readable medium that includes volatile or nonvolatile memory upon which computer readable code is stored. The processor can access the computer readable code, and the computer readable medium upon executing the code, carries out functions as described herein below. The controller 42 controls the voltage, current, and duty cycle of electrical signals that are sent to the motor 16 to turn the motor 16 on and off so as to actuate the throttle valve 12. Exemplary methods by which the controller 42 determines the characteristics of the signal to send to the throttle valve 12 will be described further herein below.

Figure 2:
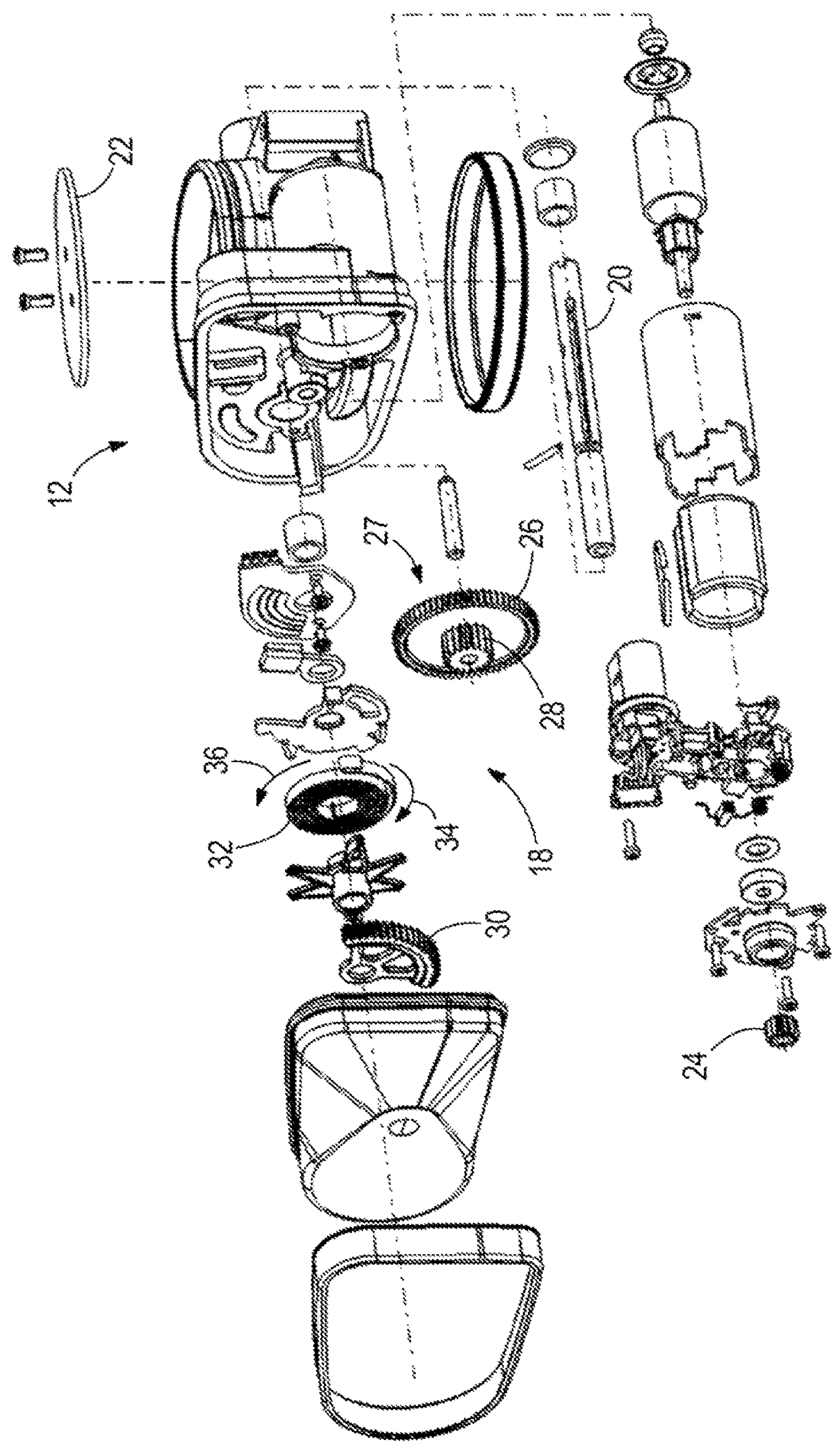
FIG. 2 illustrates one example of an electronic throttle valve according to the present disclosure.

Referring to FIG. 2, which shows an exemplary throttle valve 12, the motor 16 can be geared to the throttle valve 12 via a gear train 18, so as to transmit torque from the motor 16 to a throttle blade shaft 20, which is coupled to a throttle blade 22. For example, the motor 16 drives gear 24, which is in turn geared to an outer diameter 26 of gear 27 so as to turn gear 27. The inner diameter 28 of gear 27 is meshed with gear 30, which is directly connected to throttle blade shaft 20. A spring 32 holds the throttle blade 22 in a permanently open position when no torque is applied to the gear train 18 by the motor 16. In other words, when no current is applied to the motor 16, the throttle blade 22 rests in a limp home position determined by the force of the spring 32 tending to hold it there. In one example, the limp home position corresponds to about 5-15% of a wide open position of the throttle valve 12. In order to change a position of the throttle blade 22, the force of the spring 32 must be overcome by application of torque from the motor 16. The spring 32 has different spring constants depending on whether it is being wound, i.e. compressed in the direction of arrow 34 or unwound, i.e. pulled in the direction of arrow 36. An applied torque from the motor 16 must be enough to overcome these different spring constants in order to open or close the throttle valve 12. One example of a throttle valve such as that shown in FIG. 2 is part number 877828002, provided by Continental Automotive GmbH of Hanover, Germany.

Returning to FIG. 1, the system 10 also includes an input device 50, such as a throttle lever, touch pad, joystick, accelerator pedal, or other similar device. An operator of the system 10 may input a desired position of the throttle valve 12 via the input device 50, which is in signal communication with the controller 42. The desired throttle position may be directly mapped from a position of the input device 50, or may be mapped from a desired engine speed as determined by a position of the input device 50, as described in U.S. Pat. No. 8,762,022, which is hereby incorporated by reference herein. The system 10 also includes a throttle position sensor 38 in signal communication with the controller 42. The throttle position sensor 38 senses a current position of the throttle valve 12 and sends a signal regarding this current position along line 39 to a feedback control section 40 of controller 42. The feedback control section 40 compares the current (actual) throttle valve position to the desired throttle valve position and generates a feedback signal to correct the position of the throttle valve 12. The feedback control section 40 may be a proportional integral derivative (PD) controller that uses an error signal to gradually correct an actual value to a desired value.

According to the present disclosure, the controller 42 determines one or more feed forward signals to send to the motor 16 to move the throttle valve 12, which feed forward signals rectify backlash problems with prior art throttle control systems that rely solely on feedback control to achieve a desired position of the throttle valve 12 when the desired position is near the limp home position. For example, the controller 42 determines a first feed forward signal (velocity feed forward signal), using first feed forward calculator 44, based on the rate of change between a previous throttle valve position and the desired throttle valve position. Using a second feed forward calculator 46, the controller 42 determines a second feed forward signal (position feed forward signal) based on a comparison of the desired throttle valve position to the limp home position of the throttle valve 12, in which the throttle valve 12 is biased open by a spring 32. In one example, the desired throttle valve position and throttle valve velocity are limited by a limiter 52 before being sent to the throttle valve 12 as a throttle position and velocity setpoints. Limiting the velocity setpoint prevents an instantaneous spike in the feed forward velocity upon a step change. In one example, the limiter 52 uses a rate limit and an acceleration limit to limit the position setpoint (sent to second feed forward calculator 46 and feedback control section 40) and the velocity setpoint (sent to first feed forward calculator 44). The controller 42 determines the first feed forward signal from a look up table or similar input-output map of the first feed forward calculator 44. How the controller 42 determines the second feed forward signal will be discussed in greater detail herein below.

The controller 42 combines the first and second feed forward signals, for example at summer 48, and sends the combined signal to the motor 16 to actuate the throttle valve 12. After the throttle valve 12 has been actuated according to the combined first and second feed forward signals, the controller 42 compares the current throttle valve position to the desired throttle valve position and generates a feedback signal, using feedback control section 40, to correct the position of the throttle valve 12. During the next iteration of control, each of the outputs from the feedback control section 40, first feed forward calculator 44, and second feed forward calculator 46 are summed together at summer 48 and sent as a signal to the motor 16 to actuate the throttle valve 12.

Figure 3:
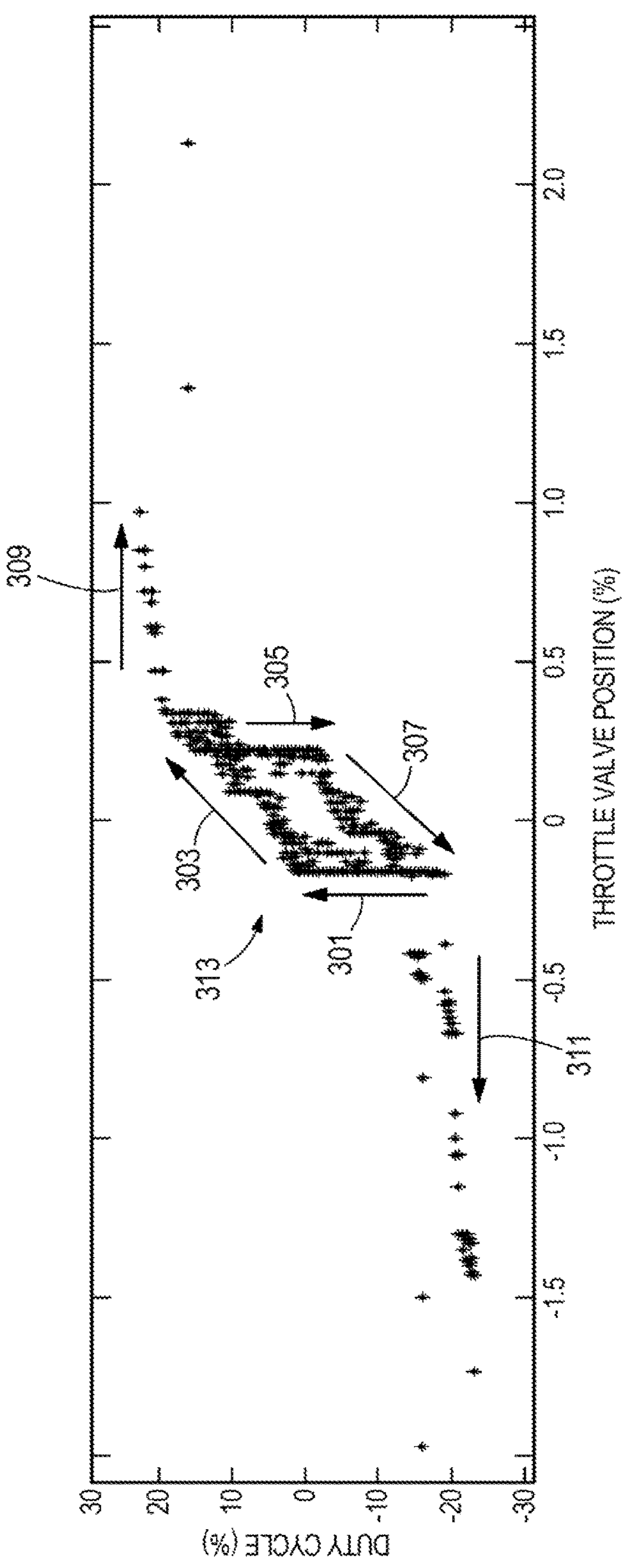
FIG. 3 illustrates movement of the throttle valve with respect to signals with varying duty cycles being sent to the motor.

Now turning to FIG. 3, the effects of backlash in the gear train 18 of the throttle valve 12 will be described. FIG. 3 is a plot of throttle valve position on the x-axis and duty cycle on the y-axis. It should be noted that a 0% throttle valve position does not mean that the throttle valve 12 is closed; rather, 0% throttle valve position corresponds to the neutral position of the throttle valve 12, in which the motor is not applying torque to the throttle blade shaft 20, and therefore the spring 32 is at rest and the throttle blade 22 is in the limp home position. According to the plot shown in FIG. 3, sending a signal with a positive duty cycle to the motor 16 will open the throttle valve 12, i.e. move the throttle valve position as measured on the x-axis to the right; while sending a signal with a negative duty cycle to the motor 16 will close the throttle valve 12, i.e. move the throttle valve position as measured on the x-axis to the left. FIG. 3 shows how near the neutral 0% position of the throttle valve 12, there is a large discontinuity. In this neutral zone 313, the behavior of the throttle valve 12 in response to increasing and decreasing duty cycles exhibits hysteresis. As the duty cycle increases as shown by arrow 301, the throttle valve position does not change, i.e. the throttle valve does not open despite increasing duty cycle. As the duty cycle increases more, the position of the throttle valve exhibits a somewhat linear response to a change in the duty cycle, as shown by arrow 303. Similarly, as the duty decreases as shown by arrow 305, the throttle valve position again shows very little response, i.e. a decrease in duty cycle does not result in closing of the throttle valve 12. In response to continual decreasing of the duty cycle, the throttle valve begins to close with a somewhat linear response as shown by arrow 307. In prior art systems, when the duty cycle of the signal sent to the motor 16 is in this zone 313, it is possible for the output of the feedback control section 40 to loop around the arrows 301, 303, 305, 307 until the output of the feedback controller 40 has wound up enough to push the response of the throttle position out of the neutral zone.

This response of the throttle valve position to the change in duty cycle illustrates the effects of both backlash in the gear train 18 as well as a change from loading one side of the spring 32 to loading an opposite side of the spring 32 as the throttle blade 22 crosses over the limp home position. In one example of the present system, the second feed forward calculator determines a second feed forward signal that compensates for both the backlash of the gear train 18 and for the shift in load due to the different spring constant as the throttle blade 22 crosses over the limp home position. To do so, the controller 42 varies the second feed forward signal depending on whether moving the throttle valve 12 from the previous position to the desired position requires a directional change in movement of the throttle valve 12. If a directional change is not required, the controller 42 will either add or subtract an incremental duty cycle using a second feed forward signal that is based on a difference between the desired throttle position and the previous throttle position. For example, if the controller 42 determines that the desired throttle position is in the neutral zone and is increasing, the controller 42 may add an incremental duty cycle to step over the backlash in the system represented at arrow 301. In other words, the controller 42 increments the duty cycle high enough to effect a change in the throttle valve position and shift it out of the neutral zone 313.

On the other hand, if a directional change of the throttle blade 22 is required (i.e. the throttle valve is changing from opening to closing, or vice versa), the controller 42 may either add or subtract a step change in duty cycle using the second feed forward signal so as to overcome the backlash of the gear train 18. To do so, the controller 42 could effelctively add or subtract a step change that would bring the throttle position all the way from the area where the backlash shown by arrows 301 and 305 begins, to where the backlash ends. In effect, the duty cycle step change provided by the second feed forward signal would cause the load on the gear teeth to jump from one side to the other. Providing this switched loading on the gear teeth with a tfeed forward signal avoids problems associated with prior art feedback-only control, in which the feedback controller would wind up to the provide the required switched loading and eventually slam the loading in the opposite direction, which required that the feedback control section later unwind.

Continuing the example in which the duty cycle is increasing, once the duty cycle has increased as shown at arrow 303 so much that the throttle valve position exits the neutral zone 313, the response of the throttle valve position to the duty cycle begins to level off, as shown at arrow 309. This means that roughly the same duty cycle is required to effect any given position of the throttle valve 12. Similarly, as the duty cycle is decreasing as shown by arrow 307, the response of the system eventually levels off as shown by arrow 311, where the duty cycle required to maintain a particular throttle valve position is roughly constant.

Figure 4:
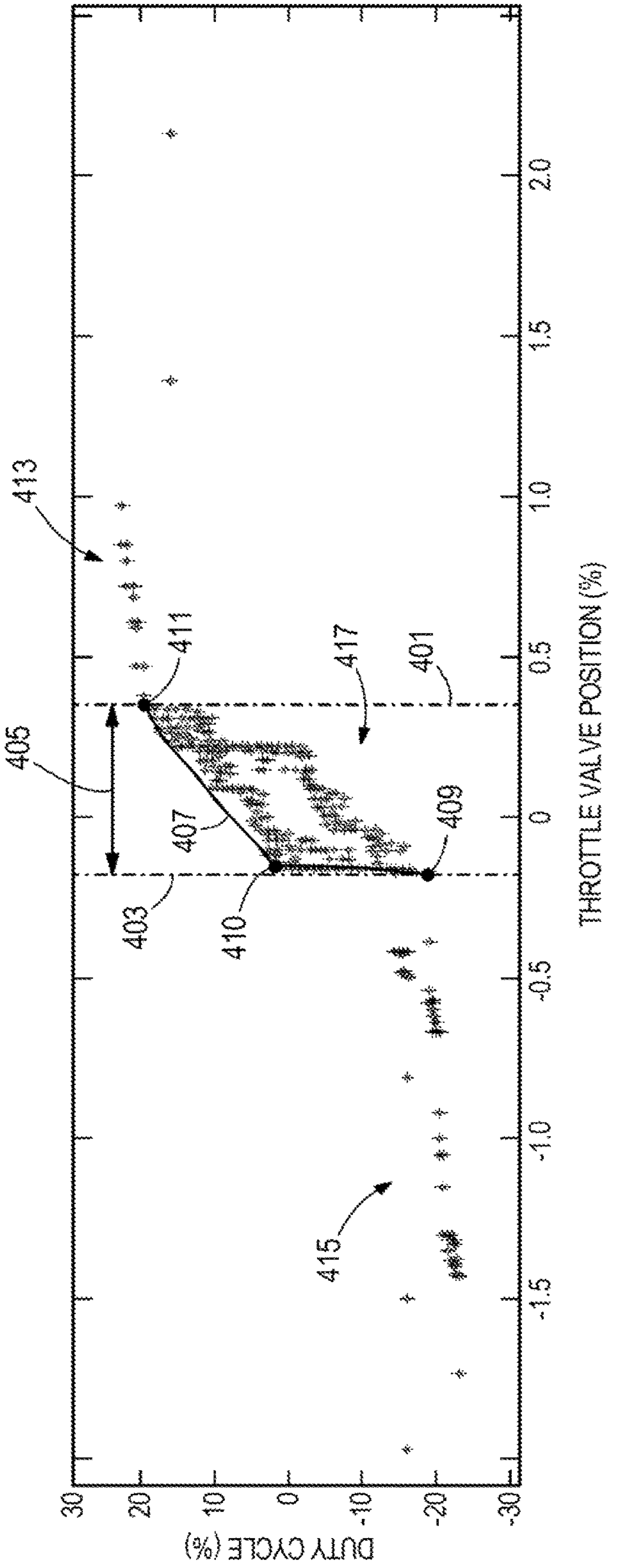
FIG. 4 illustrates how a duty cycle curve can be interpolated from movement of the throttle valve in response to the varying duty cycles.

Turning to FIG. 4, the response of the system at arrows 309 and 311 can be correlated to upper and lower throttle valve position thresholds 401, 403, respectively. The upper throttle valve position threshold 401 corresponds to a first duty cycle, for example around 20% as shown in the FIGURES, that is required to overcome a force of the spring 32 in a first direction (winding or unwinding) and the backlash of the gear train 18 as the throttle valve 12 is opening. The lower throttle valve position threshold 403 corresponds to a second duty cycle (for example around −20% as shown in the FIGURES) required to overcome a force of the spring 32 in a second direction (the other of winding and unwinding) and the backlash of the gear train 18 as the throttle valve 12 is closing. The area between the upper throttle valve position threshold 401 and lower throttle valve position threshold 403 represents a dead band 405 around the limp home position of the throttle valve 12.

Still referring to FIG. 4, in another example of the present system 10, the controller 42 determines the second feed forward signal from a duty cycle curve that extends between the upper throttle valve position threshold 401 and the lower throttle valve position threshold 403. This duty cycle curve, represented by the line 407, can be interpolated between the two thresholds 401, 403. In one example, as shown in FIG. 4, the curve 407 is determined from actual data taken from a test sweep of varying duty cycles, with recording of the resulting throttle valve position. The linear interpolation method provides a different way to account for the backlash of the gear train 18 and the varying spring constant around the limp home position of the throttle valve 12. This method does not require the addition or subtraction of an incremental duty cycle or a step change in the duty cycle; rather, the neutral zone compensation is characterizable by a linear interpolation between break points 409, 411 where the responsiveness of the system to increasing or decreasing duty cycle begins to level out.

In one example, the curve 407 includes a neutral point 410, representing a position of the throttle valve 12 when the applied duty cycle is zero, i.e. the limp home position. This limp home position 410 may or may not correspond exactly to a 0% throttle valve position depending on whether a biasing force is present, e.g. the throttle blade shaft 20 is slightly offset or there is an air foil/wedge on one side of the throttle blade 22. The second feed forward signal can be determined from this curve 407: for example, the required duty cycle can be calculated using one or more linear equations representing the curve 407, given an input desired throttle valve position. In one example, the curve 407 may have two different slopes, i.e. between point 409 and 410, and between point 410 and 411, and therefore two different linear relationships between the input desired throttle valve position and the output second feed forward term. In another example, the curve 407 may have one slope and may extend directly from point 409 to 411.

Because the response of the system 10 to a signal's duty cycle is predictable above and below the upper and lower throttle valve position thresholds 401, 403, respectively, a calibratable feed forward signal may be provided as the second feed forward signal above and below these thresholds 401, 403. For example, the second feed forward signal may be a first predetermined duty cycle (in the example, 20%) when the desired throttle valve position is above the upper throttle valve position threshold 401, and may be a second predetermined duty cycle (in the example, −20%) when the desired throttle valve position is below the lower throttle valve position threshold 403. These exemplary duty cycles would of course vary depending on the particular throttle valve 12, motor 16, and other components of the system 10. The predetermined duty cycles can be calibrated values that are retrieved by the second feed forward calculator 46, or can be adapted as the system learns the neutral point of the throttle valve 12.

In one example, the controller 42 learns the limp home position 410 of the throttle valve 12 on the duty cycle curve 407 when a commanded duty cycle is zero and an actual position of the throttle valve 12 is within a predetermined range of an estimate of the limp home position. The limp home position can be learned or adapted and stored in the memory 54 between key cycles. The learning of the limp home position of the throttle valve occurs during normal operation of the throttle valve 12 and is non-intrusive. Any time the commanded duty cycle is zero (within a calibratable window), actual position is within a calibratable range of the estimated neutral point, and there is not a throttle control error present, the learning will occur.

FIGS. 3 and 4 therefore illustrate three unique control zones for the throttle valve 12. The first control zone is represented by area 413, where the throttle valve position setpoint (desired throttle valve position) is above the known high end of the neutral zone. In this case, the second feed forward calculator 46 outputs a calibratable feed forward term in response to a request for a throttle valve position above the upper throttle valve position threshold 401. The second zone is represented generally at area 415, where the throttle valve position setpoint is below the known low end of the neutral zone. In this case, the second feed forward calculator 46 outputs a different calibratable feed forward term in response to a request for a throttle valve position below the lower throttle valve position threshold 403. Either or both of these feed forward terms could instead be adapted during operation of the throttle valve, rather than being calibrated into the system. The third zone is in area 417, and represents the deadband or neutral zone where the above-described backlash compensation logic needs to be applied to the feed forward term. In this zone, the second feed forward calculator 46 may determine the second feed forward signal according to the method described with respect to FIG. 3, where incremental duty cycles and step changes in the second feed forward signal are used to provide a more predictable response of the system. Alternatively, the second feed forward calculator 46 may determine the second feed forward signal by reading the second feed forward signal from a curve 407 interpolated between the break points 409 and 411 (and in one example including the neutral point/limp home position 410) where shifting between the zones 413, 415, and 417 occurs.

After the desired throttle position shifts firom one feed forward zone to another, the second feed forward calculator 46 may optionally reset the output of the feedback control section 40, as the feedback from control in the prior zone is not relevant to feedback from control that will occur in the new zone. In another example, the PID outputs are blended out as the system shifts from one feed forward zone to another.

As mentioned above, after the throttle valve 12 has been moved according to the feed forward signals, the feedback control section 40 accounts for any error in the position of the throttle valve 12. However, by providing appropriate compensations in the neutral zone of the throttle valve 12, the electronic throttle control system now relies less on the feedback control section 40 to achieve the desired throttle valve position. This allows for a faster response and more robust control.

Figure 5:
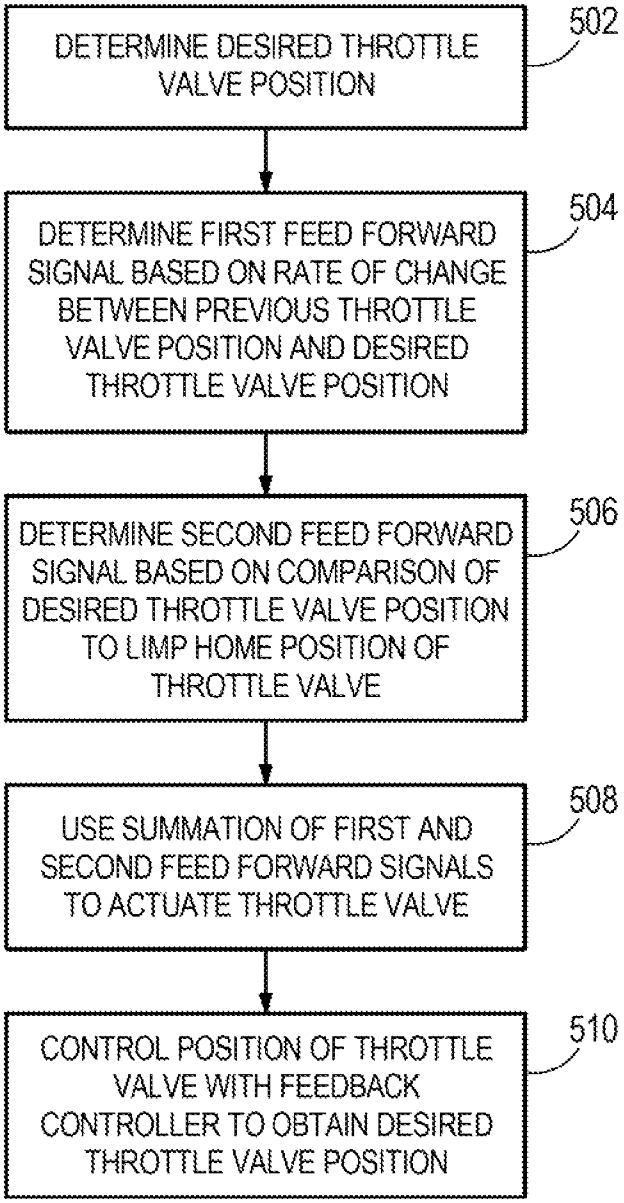
FIG. 5 illustrates one example of a method for controlling a position of an electronic throttle valve according the present disclosure.

Referring to FIG. 5, one example of a method for controlling a position of an electronic throttle valve of an internal combustion engine will be described. The method includes determining a desired throttle valve position, as shown at 502. The method next includes determining a first feed forward signal based on a rate of change between a previous throttle valve position and the desired throttle valve position, as shown at 504. As shown at 506, the method also includes determining a second feed forward signal based on a comparison of the desired throttle valve position to a limp home position of the throttle valve, in which the throttle valve is biased open by a spring. As shown at 508, the method includes using a summation of the first and second feed forward signals to actuate the throttle valve. The method also includes, after actuating the throttle valve according to the first and second feed forward signals, controlling the position of the throttle valve with a feedback controller so as to obtain the desired throttle valve position, as shown at 510.

In one example, the second feed forward signal also compensates for backlash of a gear train that couples a motor to the throttle valve. The second feed forward signal may vary depending on whether moving the throttle valve from the previous position to the desired position requires a directional change in movement of the throttle valve. In one example, the method includes one of adding and subtracting an incremental duty cycle with the second feed forward signal based on a difference between the desired throttle position and the previous throttle position if the directional change is not required. In another example, the method further comprises one of adding and subtracting a step change in duty cycle with the second feed forward signal so as to overcome the backlash if the directional change is required.

The method may alternatively comprise detennining the second feed forward signal from a duty cycle curve that extends between an upper throttle valve position threshold and a lower throttle valve position threshold representing a deadband around the limp home position. The upper throttle valve position threshold corresponds to a first duty cycle required to overcome a force of the spring in a first direction and the backlash of the gear train as the throttle valve is opening, and the lower throttle valve position threshold corresponds to a second duty cycle required to overcome a force of the spring in a second direction and the backlash of the gear train as the throttle valve is closing. The second feed forward signal is a first predetermined duty cycle when the desired throttle valve position is above the upper throttle valve position threshold, and is a second predetermined duty cycle when the desired throttle valve position is below the lower throttle valve position threshold. The method may further include learning the limp home position of the throttle valve on the duty cycle curve when a commanded duty cycle is zero and an actual position of the throttle valve is within a predetermined range of an estimate of the limp home position.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

What is claimed is:

1. A method for controlling a position of an electronic throttle valve of an internal combustion engine, the method comprising:

determining a desired throttle valve position;

determining a first feed forward signal based on a rate of change between a previous throttle valve position and the desired throttle valve position;

determining a second feed forward signal based on a comparison of the desired throttle valve position to a limp home position of the throttle valve, in which the throttle valve is biased open by a spring;

using a summation of the first and second feed forward signals to actuate the throttle valve; and after actuating the throttle valve according to the first and second feed forward signals, controlling the position of the throttle valve with a feedback controller so as to obtain the desired throttle valve position.

2. The method of claim 1, wherein the second feed forward signal also compensates for backlash of a gear train that couples a motor to the throttle valve.

3. The method of claim 2, wherein the second feed forward signal varies depending on whether moving the throttle valve from the previous throttle valve position to the desired throttle valve position requires a directional change in movement of the throttle valve.

4. The method of claim 3, further comprising one of adding and subtracting an incremental duty cycle with the second feed forward signal based on a difference between the desired throttle valve position and the previous throttle valve position in response to the directional change not being required.

5. The method of claim 3, further comprising one of adding and subtracting a step change in duty cycle with the second feed forward signal so as to overcome the backlash in response to the directional change being required.

6. The method of claim 2, further comprising determining the second feed forward signal from a duty cycle curve that extends between an upper throttle valve position threshold and a lower throttle valve position threshold representing a deadband around the limp home position.

7. The method of claim 6, wherein the upper throttle valve position threshold corresponds to a first duty cycle required to overcome a force of the spring in a first direction and the backlash of the gear train as the throttle valve is opening, and the lower throttle valve position threshold corresponds to a second duty cycle required to overcome a force of the spring in a second direction and the backlash of the gear train as the throttle valve is closing.

8. The method of claim 7, wherein the second feed forward signal is a first predetermined duty cycle when the desired throttle valve position is above the upper throttle valve position threshold, and is a second predetermined duty cycle when the desired throttle valve position is below the lower throttle valve position threshold.

9. The method of claim 6, further comprising learning the limp home position of the throttle valve on the duty cycle curve when a commanded duty cycle is zero and an actual position of the throttle valve is within a predetermined range of an estimate of the limp home position.

10. The method of claim 1, wherein the internal combustion engine is part of a marine propulsion device.

11. A system for controlling a position of an electronic throttle valve of an internal combustion engine to a desired throttle valve position, the system comprising:

a motor coupled to the throttle valve;

a throttle position sensor sensing a current throttle valve position; and a controller in signal communication with the motor and the throttle position sensor;

wherein the controller determines a first feed forward signal based on a rate of change between a previous throttle valve position and the desired throttle valve position;

wherein the controller determines a second feed forward signal based on a comparison of the desired throttle valve position to a limp home position of the throttle valve, in which the throttle valve is biased open by a spring;

wherein the controller combines the first and second feed forward signals and sends them to the motor to actuate the throttle valve; and wherein after actuating the throttle valve according to the first and second feed forward signals, the controller compares the current throttle valve position to the desired throttle valve position and generates a feedback signal to correct the position of the throttle valve.

12. The system of claim 11, further comprising a gear train coupling the motor to the throttle valve, wherein the second feed forward signal also compensates for backlash of the gear train.

13. The system of claim 12, wherein the second feed forward signal varies depending on whether moving the throttle valve from the previous throttle valve position to the desired throttle valve position requires a directional change in movement of the throttle valve.

14. The system of claim 13, wherein the controller one of adds and subtracts an incremental duty cycle with the second feed forward signal based on a difference between the desired throttle valve position and the previous throttle valve position in response to the directional change not being required.

15. The system of claim 13, wherein the controller one of adds and subtracts a step change in duty cycle with the second feed forward signal so as to overcome the backlash in response to the directional change being required.

16. The system of claim 12, wherein the controller determines the second feed forward signal from a duty cycle curve that extends between an upper throttle valve position threshold and a lower throttle valve position threshold representing a deadband around the limp home position.

17. The system of claim 16, wherein the upper throttle valve position threshold corresponds to a first duty cycle required to overcome a force of the spring in a first direction and the backlash of the gear train as the throttle valve is opening, and the lower throttle valve position threshold corresponds to a second duty cycle required to overcome a force of the spring in a second direction and the backlash of the gear train as the throttle valve is closing.

18. The system of claim 17, wherein the second feed forward signal is a first predetermined duty cycle when the desired throttle valve position is above the upper throttle valve position threshold, and is a second predetermined duty cycle when the desired throttle valve position is below the lower throttle valve position threshold.

19. The system of claim 16, wherein the controller learns the limp home position of the throttle valve on the duty cycle curve when a commanded duty cycle is zero and an actual position of the throttle valve is within a predetermined range of an estimate of the limp home position.

20. The system of claim 11, wherein the internal combustion engine is part of a marine propulsion device.

* * * * *